Nov. 27, 1928.

T. E. PRAY 1,692,863

MINING MACHINE

Filed Dec. 26, 1924

Witness
Herbert A. Buehler

Inventor
Thomas E. Pray
Clarence F. Poole
Attorney

Nov. 27, 1928.
T. E. PRAY
1,692,863
MINING MACHINE
Filed Dec. 26, 1924   2 Sheets-Sheet 2
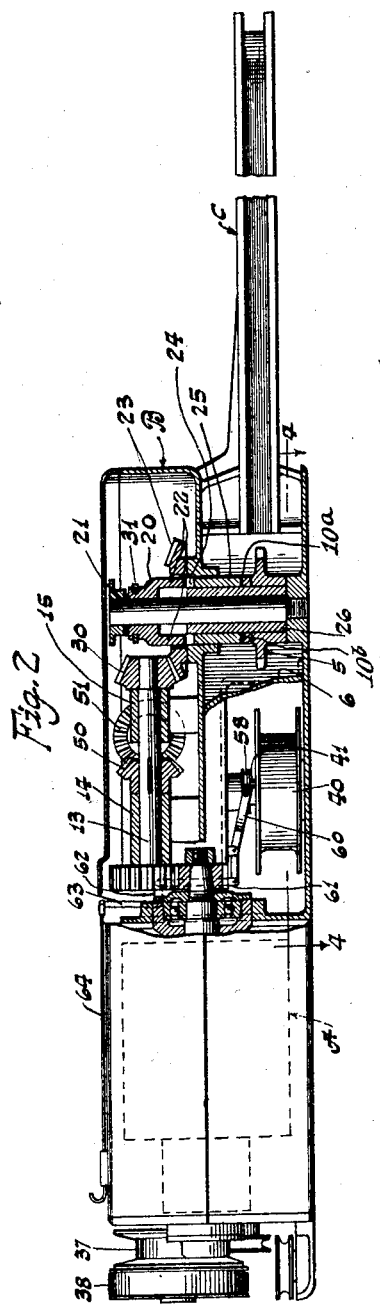
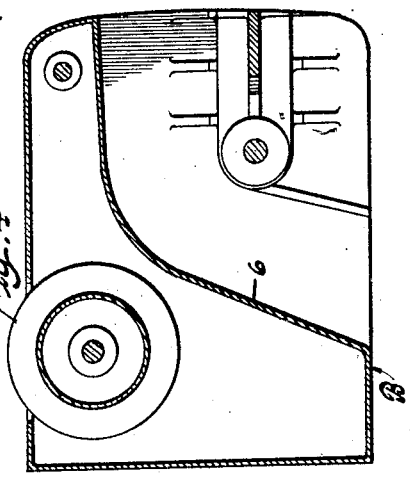
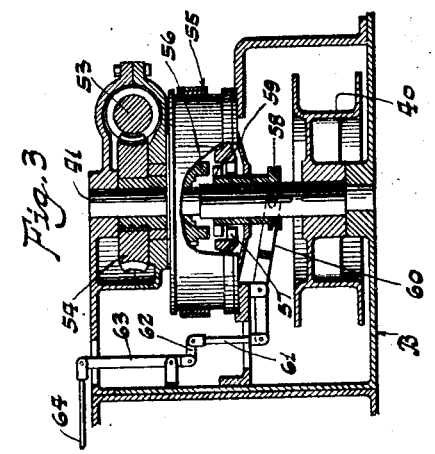
Inventor
Thomas E. Pray
Clarence T. Poole
Attorney
Witness
Herbert A. Buehler Patented Nov. 27, 1928.

1,692,863

UNITED STATES PATENT OFFICE.

THOMAS E. PRAY, OF CHICAGO, ILLINOIS, ASSIGNOR TO GOODMAN MANUFACTURING COMPANY, OF CHICAGO, ILLINOIS, A CORPORATION OF ILLINOIS.

MINING MACHINE.

Application filed December 26, 1924. Serial No. 758,037.

This invention relates to improvements in mining machines and more particularly to shortwall mining machines of the low vein type, and has for its principal object to provide an improved arrangement of the main operating parts of a machine of the class described, including the cutter bar, draft operating mechanism and cutter chain mechanism.

My invention may be best understood by reference to the accompanying drawings illustrating one embodiment thereof.

In these drawings:

Figure 2 is a side view, in part section taken on line 2—2 of Figure 1;

Figure 3 is an enlarged sectional view taken on line 3—3 of Figure 1; and

Figure 4 is a horizontal section taken on line 4—4 of Figure 2.

Figure 1:
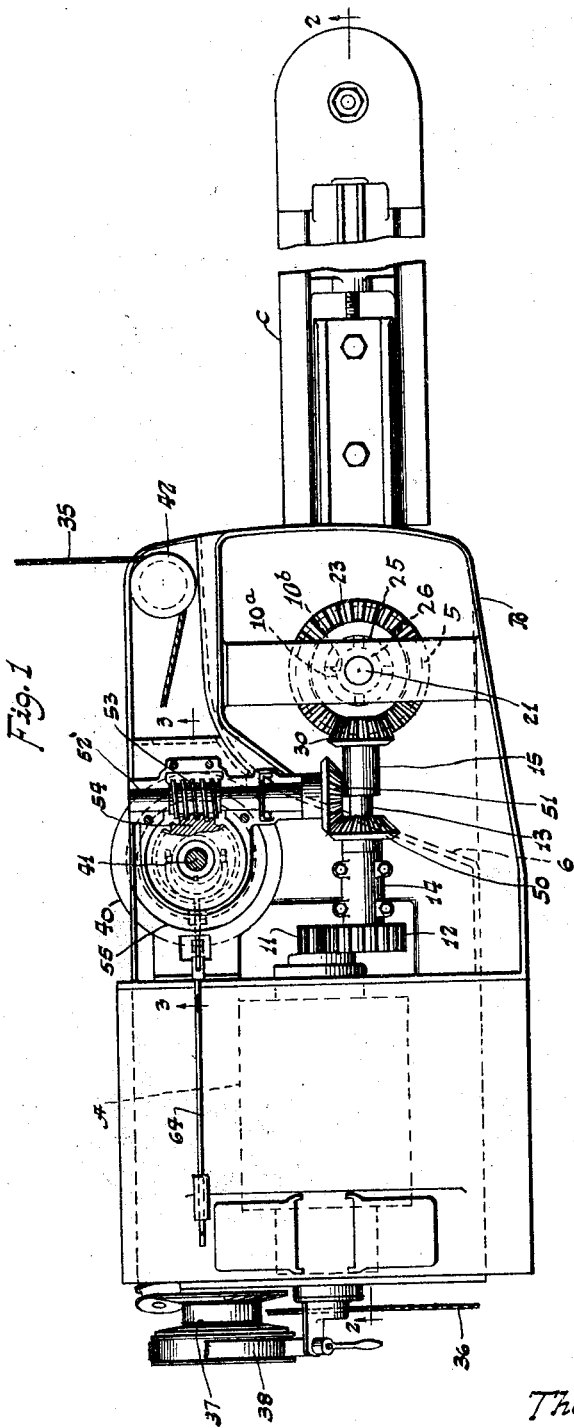
Figure 1 is a plan view of a mining machine constructed in accordance with my invention.

Referring now to the details of the drawings, the mining machine illustrated is a coal cutting machine of the low vein shortwall type in which the motor A is at the rear end of the machine and substantially determines the height of the machine, while the main operating mechanism is housed in a casing B at the forward end of the machine. A cutter bar C of the usual form is rigidly connected to the frame and extends longitudinally thereof. This cutter bar is provided with an endless cutter chain driven by a chain sprocket 5 in the usual manner. Details of the cutter chain are not shown as they are well understood by those familiar with the art. The arrangement is such that the cuttings drawn rearwardly by the cutter chain pass through a longitudinal passageway formed by a side wall 6 and thence laterally around the sprocket 5 toward the following side of the machine where they are discharged.

The motor is provided with an armature driving pinion 11 at the forward end thereof, meshed with a gear 12 on the longitudinal shaft 13. This shaft is journalled in suitable bearings 14 and 15. The chain driving mechanism including the chain sprocket 5 has operative connection with this shaft through a vertically movable clutch member 20 slidably mounted on an upright shaft 21 and having downwardly extending clutch fingers 22, 22, passing through a bevel gear 23 so as to be operatively connectible at will with vertically disposed clutch jaws 24, 24, at the upper end of a sleeve 25. This sleeve is rotatably mounted on a bearing sleeve 26 on shaft 21 and has driving connection with the chain sprocket 5. In the form shown this driving connection comprises a pair of tongued members 10ª, 10ª, fitting into sockets 10ᵇ, 10ᵇ, formed in the lower end of the sleeve 25 as shown in Figure 2. The bevel gear 23 is meshed with a bevel pinion 30 on the forward end of the longitudinal shaft 13. The clutch member 20 rotates in all positions with the bevel gear 23 and is shifted vertically by means of a clutch collar 31 of the usual form.

The feed operating mechanism includes a pair of draft ropes acting on opposite ends of the machine frame during the lateral cutting operation in a manner well known to those familiar with the art. In the particular embodiment illustrated herewith, the feed rope 35 is adapted to be driven by power from the motor while the tail rope 36 is wound upon a drum 37 at the rear end of the machine frame, this drum being under control of a friction band 38 in the usual manner for retarding th rear end of the machine frame.

Referring now to details of the driving mechanism for the feed rope, I provide a winding drum 40 keyed on a vertical shaft 41. Said winding drum is located in housing B on the advancing side of the wall 6 of the cuttings passageway and rearwardly of the cutter chain sprocket 5. As herein shown this drum is at the lower end of the upright shaft 41, in substantially horizontal alignment with the guide sheaves 42 at the forward end of the machine frame about which the feed rope 35 passes from the winding drum 40. Operative connection between the winding drum 40 and the motor is provided herein comprising a bevel pinion 50 on a longitudinal shaft 13 meshed with the bevel pinion 51 on a transverse shaft 52. A worm 53 is carried on this transverse shaft and is meshed with a worm gear 54 mounted loosely on the upper end of the upright shaft 41. This worm gear is associated with a planetary variable speed device 55 which may be of any suitable construction details of which need not be described except to point out a high speed member 56 and a low speed member 57. A sliding clutch member 58 is feathered on the upright shaft 41 and is provided with the clutch jaws 59, 59, movable into position to engage either the high speed member 56 or the low speed member 57. This clutch member may be shifted by any suitable means such as a shifter yoke 60 operable through links 61, 62 and 63, extending upwardly through the housing B and connected with an operating lever 64 extending to the rear end of the machine frame as shown in Figure 2. The drum 40 may thus be driven either at high or low speed through the clutch connections just described.

The arrangement of the feed drum on a vertical axis as above described provides a compact and simple construction. The drum is located rearwardly of the cutter chain sprocket and on the advancing side of the machine so as not to interfere with the discharge passageway for the cuttings. The gearing and control devices for said drum are simple and readily accessible for inspection and repair.

While I have shown and described one embodiment of my invention, it will be understood that the arrangement and construction of the various parts may be altered without departing from the spirit and scope thereof. Furthermore, I do not wish to be interpreted as limiting myself to the particular construction illustrated, excepting as it may be specifically limited in the appended claims.

I claim as my invention:

1. In a mining machine, a frame having a cutting element projecting longitudinally from the forward end thereof, flexible feeding and guiding means including a feed element operable on the forward end of said frame to move the same laterally during the cutting operation, a winding drum for said feed operating element located on the advancing side of said frame on a vertical axis and rearwardly of said cutter arm, a motor mounted rearwardly of said winding drum, and operative connections between said motor and said drum including a variable speed planetary device located concentric with and above said drum.

2. In a mining machine, a frame having a cutting element projecting longitudinally from the forward end thereof, flexible feeding and guiding means including a feed element operable on the forward end of said frame to move the same laterally during the cutting operation, a winding drum for said feed operating element located on the advancing side of said frame on a vertical axis and rearwardly of said cutter arm, a motor mounted rearwardly of said winding drum, and operative connections between said motor and said drum including a longitudinal shaft having operative connection with said cutting element, a transverse shaft having geared connection with said longitudinal shaft, a planetary gear mechanism arranged concentric with said winding drum and above the same and having geared connection with said transverse shaft, and a clutch interposed between said planetary gear and said winding drum.

3. In a mining machine, the combination of an elongated frame forming a cuttings passageway and having a cutter bar extending longitudinally from the front end thereof, a cutter chain orbitally movable on said cutter bar, a feed rope adapted for pulling the machine frame laterally, a feed operating member comprising a winding drum rotatable on a vertical axis, said drum rotating in substantially the same horizontal plane as said cutter chain but disposed toward the rear of said passageway, and a motor having operative connection with said cutter chain and said winding drum.

4. In a mining machine, the combination of an elongated frame forming a cuttings passageway and having a cutter bar extending longitudinally from the front end thereof, a cutter chain orbitally movable on said cutter bar, a feed rope adapted for pulling the machine frame laterally, a feed operating member comprising a winding drum rotatable on a vertical axis, said drum rotating in substantially the same horizontal plane as said cutter chain but disposed toward the rear and advancing side of said passageway, and a motor having operative connection with said cutter chain and said winding drum.

5. In a mining machine, an elongated frame comprising a motor section and a gear housing together forming a bottom wall or plate adapted to slide upon a mine bottom, said housing forming a passageway and having a cutter bar extending longitudinally from the front end thereof, a cutter chain orbitally movable on said cutter bar, a feed rope adapted for pulling the machine frame laterally, a feed operating member comprising a winding drum rotatable on a vertical axis, said drum being disposed toward the advancing side of said frame and toward the rear of said passageway, and a motor having operative connection with said cutter chain and said winding drum.

6. In a mining machine, an elongated frame comprising a motor section and a gear housing together forming a bottom wall or plate adapted to slide upon a mine bottom, said housing forming a passageway and having a cutter bar extending longitudinally from the front end thereof, a cutter chain orbitally movable on said cutter bar, a feed rope adapted for pulling the machine frame laterally, a feed operating member comprising a winding drum rotatable on a vertical axis, said drum being disposed toward the advancing side of said frame and toward the rear of said passageway and having bearing support upon said bottom plate, and a motor having operative connection with said cutter chain and said winding drum.

Signed at Chicago, in the county of Cook and State of Illinois, this 24th day of December, A. D. 1924.

THOMAS E. PRAY.